May 5, 1925.
A. O. HIGINBOTHAM
TRACTOR DRAFT RIGGING
Filed Jan. 13, 1921
1,536,217
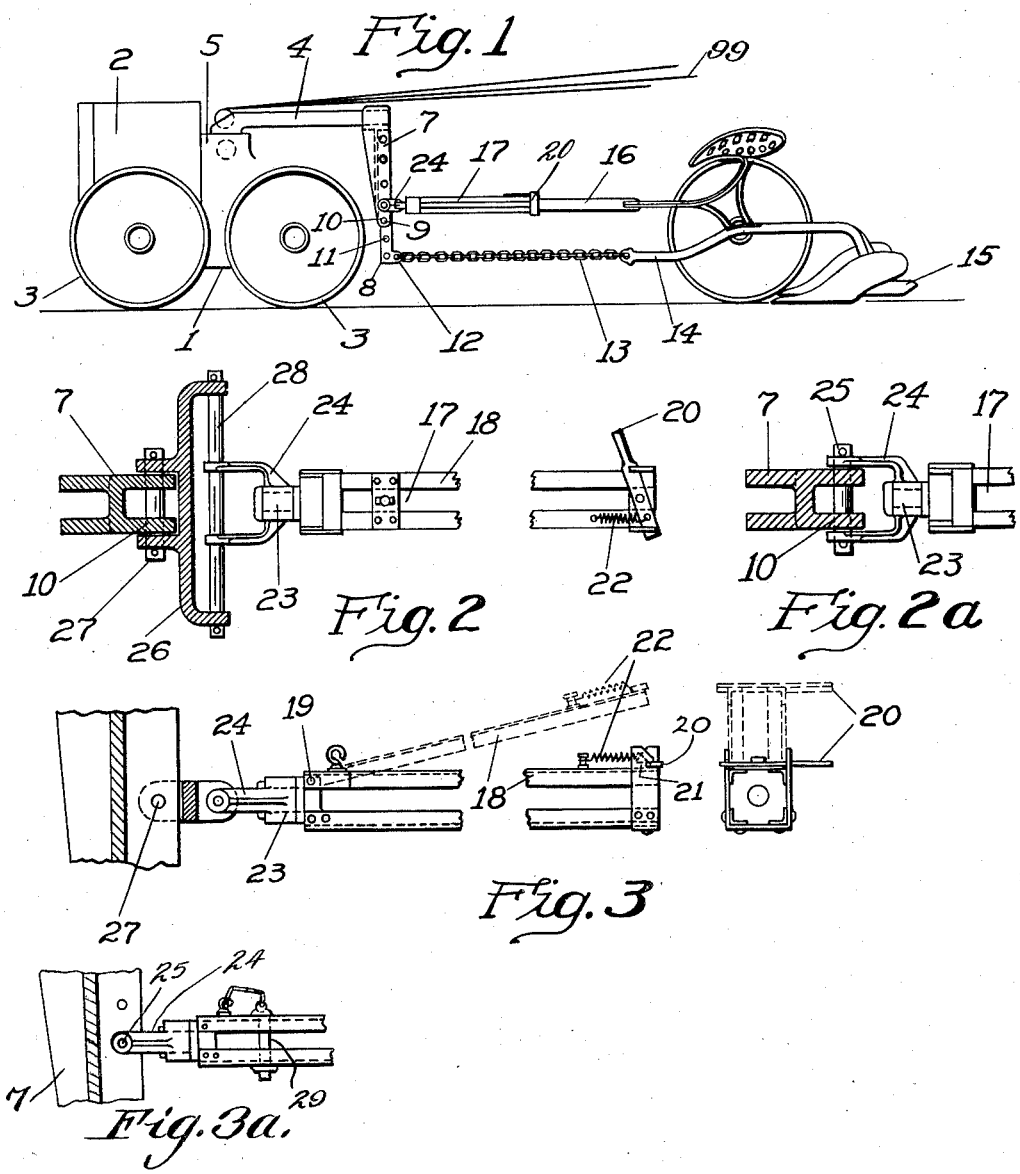

Patented May 5, 1925.

1,536,217

UNITED STATES PATENT OFFICE.

ARTHUR O. HIGINBOTHAM, OF WORCESTER, MASSACHUSETTS, ASSIGNOR TO THE G. F. H. CORPORATION, OF DENVER, COLORADO, A CORPORATION OF MASSACHUSETTS.

TRACTOR DRAFT RIGGING.

Application filed January 13, 1921. Serial No. 436,983.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in a Tractor Draft Rigging, of which the following, together with the accompanying drawings, is a specification.

The present invention relates to motor vehicles of the tractor type, as used in agricultural and other related work, especially to the draft rigging thereof.

The present invention contemplates improvements of a radical nature in devices of this class, with particular reference to the draft rigging of the tractor.

One object of the invention is to provide a draft rigging which is universal in its adaptability to any and all kinds of vehicles, implements, trailers or the like, which it may be desired to connect with the tractor. Other and further advantages of the invention will be apparent from the following description, in connection with which reference is had to the accompanying drawings, wherein—

Fig 1 is a general view in side elevation of a tractor embodying the improvements noted above, the same being shown in connection with a farm implement, such as a two-way plow.

Fig. 2 is an enlarged plan view, showing details of the draft rigging that is illustrated in Fig. 1.

Fig. 2ª is a similar view, showing a different arrangement of the same draft rigging.

Fig. 3 is a view in side elevation of the parts that are shown in Fig. 2.

Fig. 3ª is a view in side elevation of the modification of Fig. 2ª.

Like reference characters refer to like parts in the different figures.

As shown in Fig. 1, the frame of the tractor is indicated at 1, this frame supporting, in any suitable manner, a motor 2. The frame is itself supported by a set of traction wheels 3, 3. A draft member 4 is attached to the tractor frame by any suitable means, such means consisting, in the present disclosure of the invention, of a turntable indicated at 5, Fig. 1.

The free end of the overhanging draft member 4 furnishes the point of attachment for a draft chain, or other equivalent draft connection by which an implement, such as the illustrated two-way plow, is pulled forward by the tractor. As herein shown, the distance of this point of attachment above the ground is susceptible of variation, by making the lower end of depending portion 7 extensible. For this purpose, said portion 7 may take the form of a channel section, adapted to receive adjustably a bar 8, the latter being secured at the desired height by means of pins 9, 9 that are entered, selectively, into registering holes 10, 10 and 11, 11 of the portion 7 and bar 8 respectively. In the case of the illustrated two-way plow, or similar implement, a draft chain 13 is connected to a lug 12 on the bar 8, and to the plow beam 14 which supports the plowshares 15. The usual tongue 16 of such an implement is adapted to be connected to the draft member 4 at any convenient point above the point of draft hitch, as will now be described.

According to the invention, the draft rigging is equipped with a tongue receiving member 17, the same providing an elongated socket substantially rectangular in cross section for holding the forward end of the tongue of the attached implement, trailer, or other vehicle. To facilitate the entry of the tongue end in the socket or opening of the member 17, the latter has a top plate 18, hinged at 19; when the plate 18 is swung upwardly into the dotted line position of Fig. 3, the tongue of the implement, trailer, or other vehicle can readily be entered into the socket or opening of member 17, without the backward and forward manœuvring of both vehicles that would be necessary if the pole had to be inserted endwise in the socket. The top plate 18, when swung down into closed position, is held in place by a locking lever 20, the latter being maintained in engagement with a notch 21 by means of a yielding spring 22.

The tongue receiving member 17 provides a pin or pivot 23 for rotating movement at its forward end, the same having mounted thereon a yoke 24, adapted for turning movement about the longitudinal axis of the member 17. The bifurcated arms of yoke 24 are adapted to embrace the depending portion 7 of draft member 4, as shown in Fig. 2ª, said arms having registering apertures for the passage of a pin 25, whereby the yoke is secured to the draft member at any desired height, according to the location of the holes 10 in the depending portion 7. This arrangement of the draft rigging, as shown in Fig. 2ª, is the arrangement employed with any ordinary wheeled implement, vehicle or trailer where the point of hitch does not shift; in the case of certain vehicles, wherein the draft is taken through the pole, the bar 8 and chain 13 can obviously be dispensed with, the pole in such case being secured against endwise movement in the member 17 by means of a pin 29, which passes through suitable openings in the socket member 17 and in the pole.

In certain cases however, notably with a two-way plow as shown in Fig. 1, the point of hitch of draft chain 13, or other equivalent draft connection, must shift from one side of the implement or trailer to the other; in order to compensate for this shifting, the draft rigging is furnished with an auxiliary yoke 26, that is adapted to be used between the yoke 24 and the draft member 4 when conditions such as those described above make it necessary. The yoke 26 is adapted to be secured to the depending portion 7, as shown in Fig. 2, by means of a pivoted pin 27 passing through the holes 10. The yoke 26 provides an elongated cross bar 28 passing loosely through holes in the arms of yoke 24, so that said yoke 24, with its attached socket member 17, can shift freely to one side or the other of the auxiliary yoke 26 whenever the point of hitch of the implement makes a corresponding shift.

A draft rigging constructed and arranged as above described, takes care of any and all contingencies that may arise in the attachment of any kind of implement, trailer, or other vehicle to the tractor. In a case where the draft is taken through the pole of an implement, trailer, or other vehicle, as shown in Fig. 2ª, said pole is made rigid with the member 17 by the use of pin 29, so that only the desired relative movement, on the axes afforded by pins 25 and 23, can take place. With implements or other vehicles where the pole serves merely for steering and reversing purposes and where the draft is through a chain or other equivalent draft connection, the bar 8 may be brought into use in order to furnish a point of attachment as close as need be to the ground, or if desired, the draft chain may be attached directly to the depending portion 7 of draft member 4. Finally, when using the tractor with implements or the like that have a shifting point of hitch such as a two-way plow, the auxiliary yoke 26 may be introduced, as above described, to take care of the lateral shift in the line of draft that occurs when one plowshare is withdrawn and the other placed into position for the commencement of a new furrow. Under these conditions, the pole is of course free to move backward and forward longitudinally in the socket member 17, since the pin 29 is not in use.

I claim,

1. The combination with a tractor draft member, of an attached socket member to receive the pole of the drawn implement, trailer or other vehicle, said socket member being pivotally connected to said draft member for movement in a vertical plane and being constrained to move with said draft member in a horizontal plane, the said socket member being also free to turn about the longitudinal axis of said pole.

2. In a tractor, a draft member, a pole receiving member attached to said draft member, and means permitting the broadside entry of a pole in said pole receiving member by the swinging aside of a portion of the latter.

3. The combination with a tractor draft member, of an attached socket member to receive the pole of the drawn implement, and roll therewith, and means permitting the lateral shifting of said socket member relative to said draft member, to compensate for changes in the line of draft between the tractor and said drawn device.

4. The combination with a tractor draft member, of a pole receiving member, means permitting pivotal movement of same in a vertical plane, and an auxiliary yoke member adapted to be interposed between said draft member and said pole receiving member, to permit lateral shifting of the latter when changes occur in the line of draft.

5. The combination with a tractor draft member, of a pole receiving member adapted to be attached thereto for pivotal movement in a vertical plane, and another member adapted to be interposed between said draft member and said pole receiving member, to permit lateral shifting of the latter upon changes in the line of draft, said other member being rigid horizontally with said draft member.

ARTHUR O. HIGINBOTHAM.